US010200140B2

United States Patent
Li et al.

(10) Patent No.: US 10,200,140 B2
(45) Date of Patent: Feb. 5, 2019

(54) TECHNIQUES AND APPARATUSES FOR REDUCING INTER-CELL INTERFERENCE WITH LOW-LATENCY TRAFFIC IN NEW RADIO

(71) Applicant: QUALCOMM Incorporated, San Diego, CA (US)

(72) Inventors: Chong Li, Weehawken, NJ (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/672,910

(22) Filed: Aug. 9, 2017

(65) Prior Publication Data
US 2018/0262289 A1    Sep. 13, 2018

Related U.S. Application Data

(60) Provisional application No. 62/469,437, filed on Mar. 9, 2017.

(51) Int. Cl.
*H04W 72/08* (2009.01)
*H04B 17/30* (2015.01)
(Continued)

(52) U.S. Cl.
CPC .......... *H04J 11/005* (2013.01); *H04L 5/0035* (2013.01); *H04W 52/143* (2013.01);
(Continued)

(58) Field of Classification Search
CPC . H04W 72/00; H04W 72/04; H04W 72/0406; H04W 72/044; H04W 72/08; H04W 72/082; H04B 17/30; H04B 17/345
See application file for complete search history.

(56) References Cited

U.S. PATENT DOCUMENTS

2011/0250918 A1* 10/2011 Jen .................. H04W 52/08
                                                                455/509
2012/0184206 A1*  7/2012 Kim .................. H04L 5/0091
                                                                  455/9

(Continued)

OTHER PUBLICATIONS

CATT: "eIMTA UE Capability and Configurations", 3GPP Draft; R1-142881, 3rd Generation Partnership Project (3GPP), Mobile Competence Centre; 650, Route Des Lucioles; F-06921, Sophia-Antipolis Cedex; France, vol. Ran WG1, No. Dresden, Germany; Aug. 18, 2014-Aug. 22, 2014 Aug. 17, 2014, XP050788365, Retrieved from the Internet URL: http://www.3gpp.org/ftp/Meetings_3GPP_SYNC/RAN1 /Docs/ [retrieved on Aug. 17, 2014], 3 pages.

(Continued)

*Primary Examiner* — Blane Jackson
(74) *Attorney, Agent, or Firm* — Harrity & Harrity, LLP

(57) ABSTRACT

A method, an apparatus, and a non-transitory computer-readable medium for wireless communication are provided. The apparatus, which is associated with a first cell, may receive communication information of a second cell, wherein the communication information is associated with a transmission, of a base station associated with the second cell, to an ultra-reliable low latency communication (URLLC) user equipment (UE) located in the second cell; and/or reduce transmission power of the apparatus associated with the first cell, in at least one resource, to reduce interference with the transmission by the base station to the URLLC UE.

56 Claims, 13 Drawing Sheets

(51) Int. Cl.
*H04J 11/00* (2006.01)
*H04W 72/04* (2009.01)
*H04W 52/14* (2009.01)
*H04W 52/24* (2009.01)
*H04L 5/00* (2006.01)
*H04W 28/04* (2009.01)
*H04W 72/12* (2009.01)
*H04W 92/20* (2009.01)

(52) U.S. Cl.
CPC ..... *H04W 52/243* (2013.01); *H04W 72/0413* (2013.01); *H04W 72/082* (2013.01); *H04W 72/1284* (2013.01); *H04W 28/04* (2013.01); *H04W 72/1231* (2013.01); *H04W 92/20* (2013.01)

(56) References Cited

U.S. PATENT DOCUMENTS

| | | | |
|---|---|---|---|
| 2013/0115999 A1* | 5/2013 | Sirotkin | H04B 7/0617 455/522 |
| 2014/0220990 A1* | 8/2014 | Lorca Hernando | H04J 11/005 455/450 |
| 2014/0243002 A1* | 8/2014 | Muruganathan | H04W 72/0426 455/450 |
| 2015/0036571 A1* | 2/2015 | Taori | H04W 72/1278 370/311 |
| 2016/0198486 A1* | 7/2016 | Moshavi | H04W 72/12 455/450 |
| 2017/0142745 A1* | 5/2017 | Miao | H04W 72/1226 |
| 2018/0070369 A1* | 3/2018 | Papasakellariou | H04B 7/024 |
| 2018/0091282 A1* | 3/2018 | Lim | H04L 5/0082 |

OTHER PUBLICATIONS

Ericsson et al., "Feasibility Study on eCoMP Way Forward", 3GPP Draft; R3-141303_ECOMP Feasibility, 3rd Generation Partnership Project (3GPP), Mobile Competence Centre; 650, Route Des Lucioles; F-06921, Sophia-Antipolis Cedex; France, vol. RAN WG3, No. Seoul: South Korea; May 19, 2014-May 23, 2014 May 18, 2014, XP050795849, Retrieved from the Internet: URL:http://www.3gpp.org/ftp/Meetings_3GPP_SYNC/RAN3/Docs/ [retrieved on May 18, 2014], 4 pages.

International Search Report and Written Opinion—PCT/US2018/018038—ISA/EPO—dated May 16, 2018.

Nokia et al., "UL Grant-Free Transmission for URLLC". 3GPP Draft; R1-1703329_UL_URLLC_GRANT FREE_FINAL, 3rd Generation Partnership Project (3GPP), Mobile Competence Centre; 650, Route Des Lucioles; F-06921, Sophia-Antipolis Cedex: France, vol. Ran WG1 , No. Athens, Greece; Feb. 13, 2017-Feb. 17, 2017 Feb. 12, 2017, XP051210459, Retrieved from the Internet URL:http://www.3gpp.org/ftp/Meetings_3GPP_SYNC/RAN1/Docs/ [retrieved on Feb. 12, 2017], 8 pages.

* cited by examiner

TECHNIQUES AND APPARATUSES FOR REDUCING INTER-CELL INTERFERENCE WITH LOW-LATENCY TRAFFIC IN NEW RADIO

CROSS-REFERENCE TO RELATED APPLICATION UNDER 35 U.S.C. § 119

This application claims priority to U.S. Provisional Patent Application No. 62/469,437, filed Mar. 9, 2017, entitled "TECHNIQUES AND APPARATUSES FOR REDUCING INTER-CELL INTERFERENCE WITH LOW-LATENCY TRAFFIC IN NEW RADIO," which is hereby expressly incorporated by reference herein.

BACKGROUND

Field

Aspects of the present disclosure generally relate to wireless communication, and more particularly to techniques and apparatuses for reducing inter-cell interference with low-latency traffic in New Radio.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different wireless communication devices to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In an aspect of the disclosure, a method, an apparatus, and a computer program product are provided.

In some aspects, the method may include receiving, by a first base station associated with a first cell, communication information of a second cell, wherein the communication information is associated with a transmission, of a second base station associated with the second cell, to an ultra-reliable low latency communication (URLLC) user equipment (UE) located in the second cell; and/or reducing transmission power of the first base station associated with the first cell, in at least one resource, to reduce interference with the transmission by the second base station to the URLLC UE.

In some aspects, the apparatus may include a memory and at least one processor coupled to the memory. The at least one processor may be configured to receive, by the apparatus associated with a first cell, communication information of a second cell, wherein the communication information is associated with a transmission, of a base station associated with the second cell, to a URLLC UE located in the second cell; and/or reduce transmission power of the apparatus associated with the first cell, in at least one resource, to reduce interference with the transmission by the base station to the URLLC UE.

In some aspects, the apparatus may include means for receiving, by the apparatus associated with a first cell, communication information of a second cell, wherein the communication information is associated with a transmission, of a base station associated with the second cell, to a URLLC UE located in the second cell; and/or means for reducing transmission power of the apparatus associated with the first cell, in at least one resource, to reduce interference with the transmission by the base station to the URLLC UE.

In some aspects, the computer program product may include a non-transitory computer-readable medium storing one or more instructions for wireless communication, the one or more instructions comprising one or more instructions that, when executed by one or more processors of a first base station, cause the one or more processors to receive communication information of a second cell, wherein the first base station is associated with a first cell, and wherein the communication information is associated with a transmission, of a second base station associated with the second cell, to a URLLC UE located in the second cell; and/or reduce transmission power of the first base station associated with the first cell, in at least one resource, to reduce interference with the transmission by the second base station to the URLLC UE.

Aspects generally include a method, apparatus, system, computer program product, non-transitory computer-readable medium, user equipment, wireless communication device, base station, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
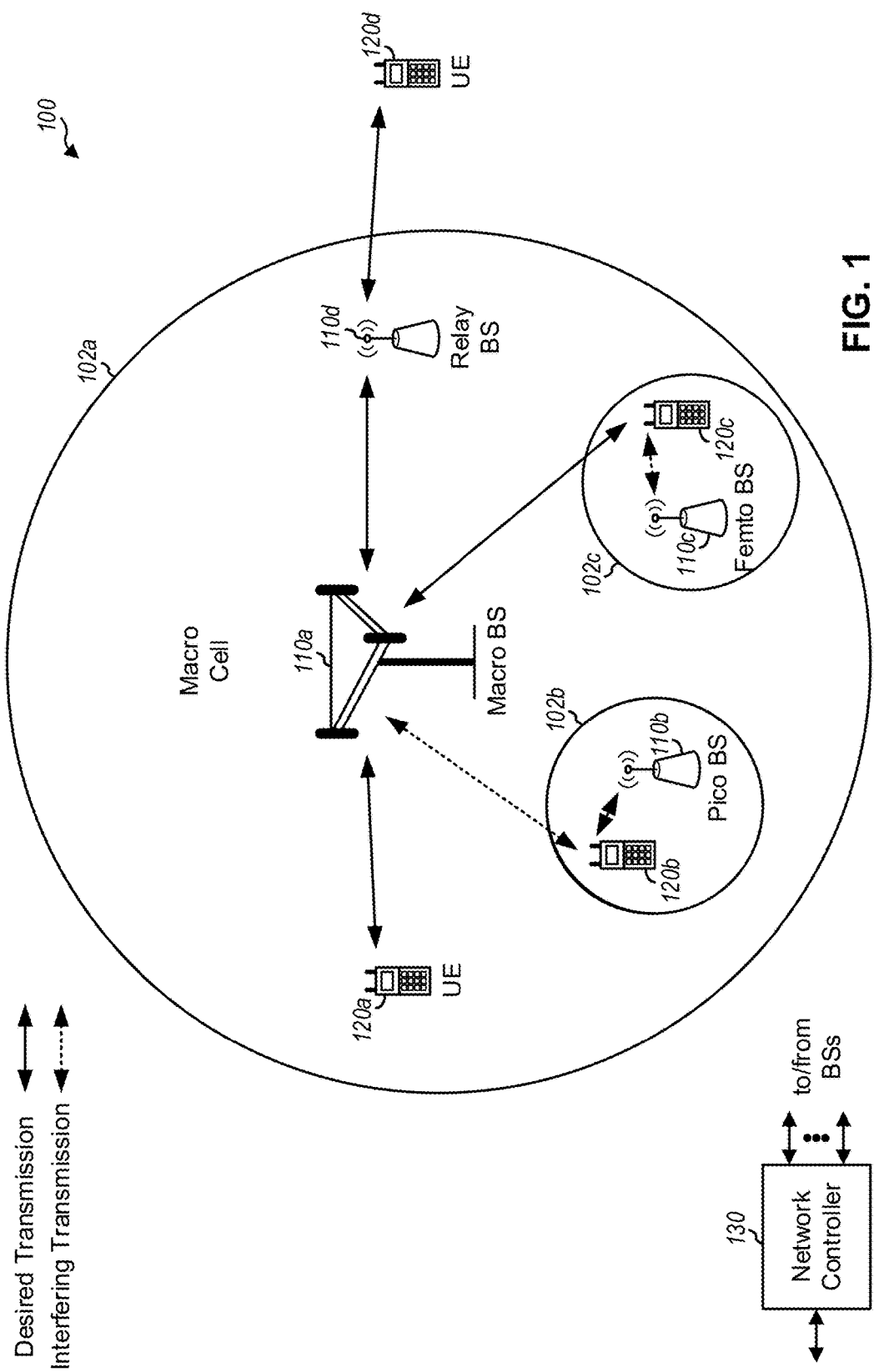
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

An access point (AP) may comprise, be implemented as, or be known as a NodeB, a Radio Network Controller (RNC), an eNodeB (eNB), a Base Station Controller (BSC), a Base Transceiver Station (BTS), a Base Station (BS), a Transceiver Function (TF), a Radio Router, a Radio Transceiver, a Basic Service Set (BSS), an Extended Service Set (ESS), a Radio Base Station (RBS), a Node B (NB), a gNB, a 5G NB, a NR BS, a Transmit Receive Point (TRP), or some other terminology.

An access terminal (AT) may comprise, be implemented as, or be known as an access terminal, a subscriber station, a subscriber unit, a mobile station, a remote station, a remote terminal, a user terminal, a user agent, a user device, a UE, a user station, a wireless node, or some other terminology. In some aspects, an access terminal may comprise a cellular telephone, a smart phone, a cordless telephone, a Session Initiation Protocol (SIP) phone, a wireless local loop (WLL)

station, a personal digital assistant (PDA), a tablet, a netbook, a smartbook, an ultrabook, a handheld device having wireless connection capability, a Station (STA), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, and/or the like), medical devices or equipment, biometric sensors/devices, an entertainment device (e.g., music device, video device, satellite radio, gaming device, and/or the like), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, and/or the like. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a TRP, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE).

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
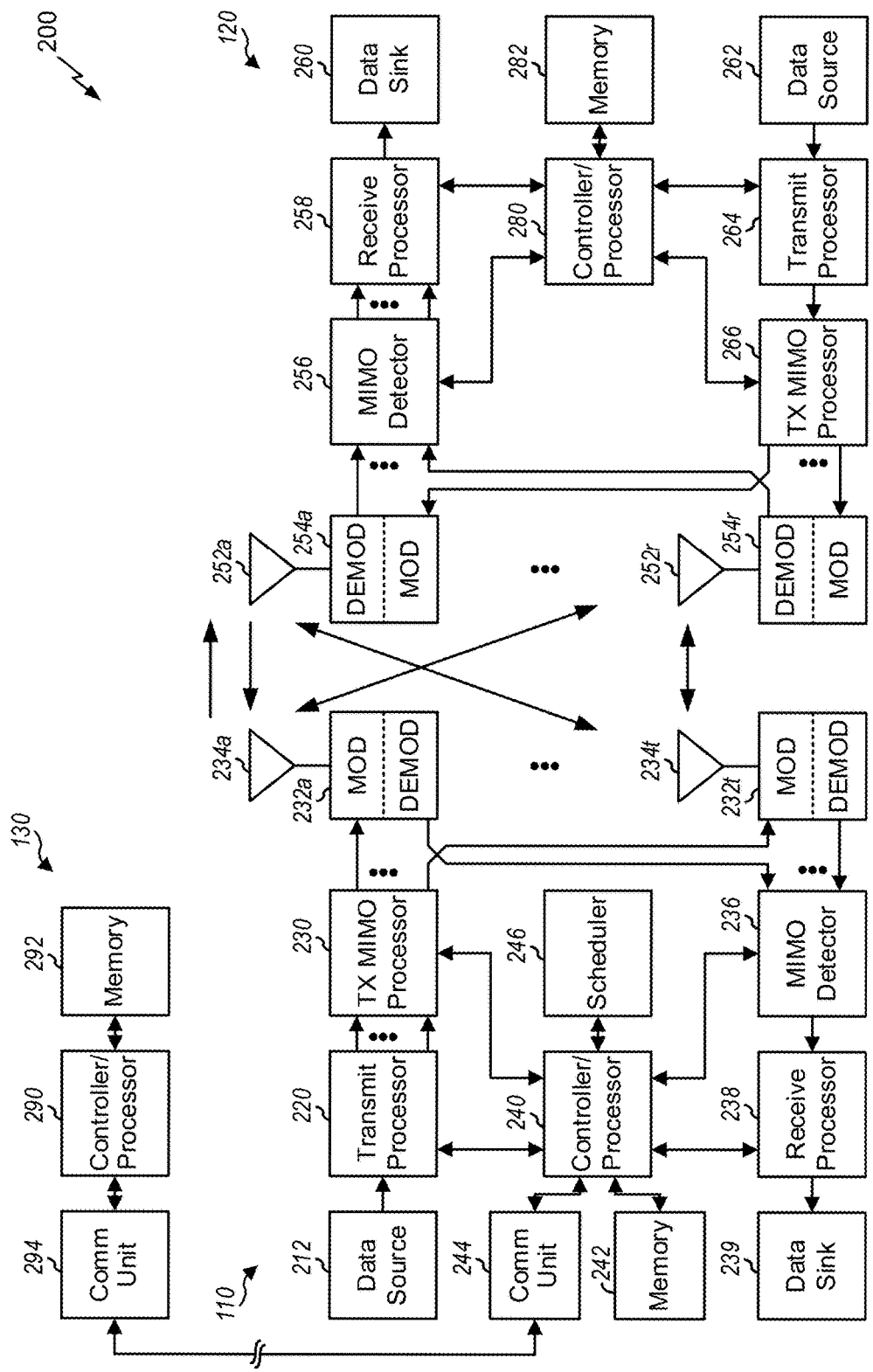
FIG. 2 is a diagram illustrating an example of a base station in communication with a UE in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at base station 110 and UE 120, respectively, to perform reducing inter-cell interference with low-latency traffic in New Radio. For example, controller/processor 280 and/or other processors and modules at base station 110, may perform or direct operations of UE 120 to perform reducing inter-cell interference with low-latency traffic in New Radio. For example, controller/processor 280 and/or other controllers/processors and modules at BS 110 may perform or direct operations of, for example, method 1200 of FIG. 12, and/or other processes as described herein. In some aspects, one or more of the components shown in FIG. 2 may be employed to perform example method 1200 of FIG. 12, and/or other processes for the techniques described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
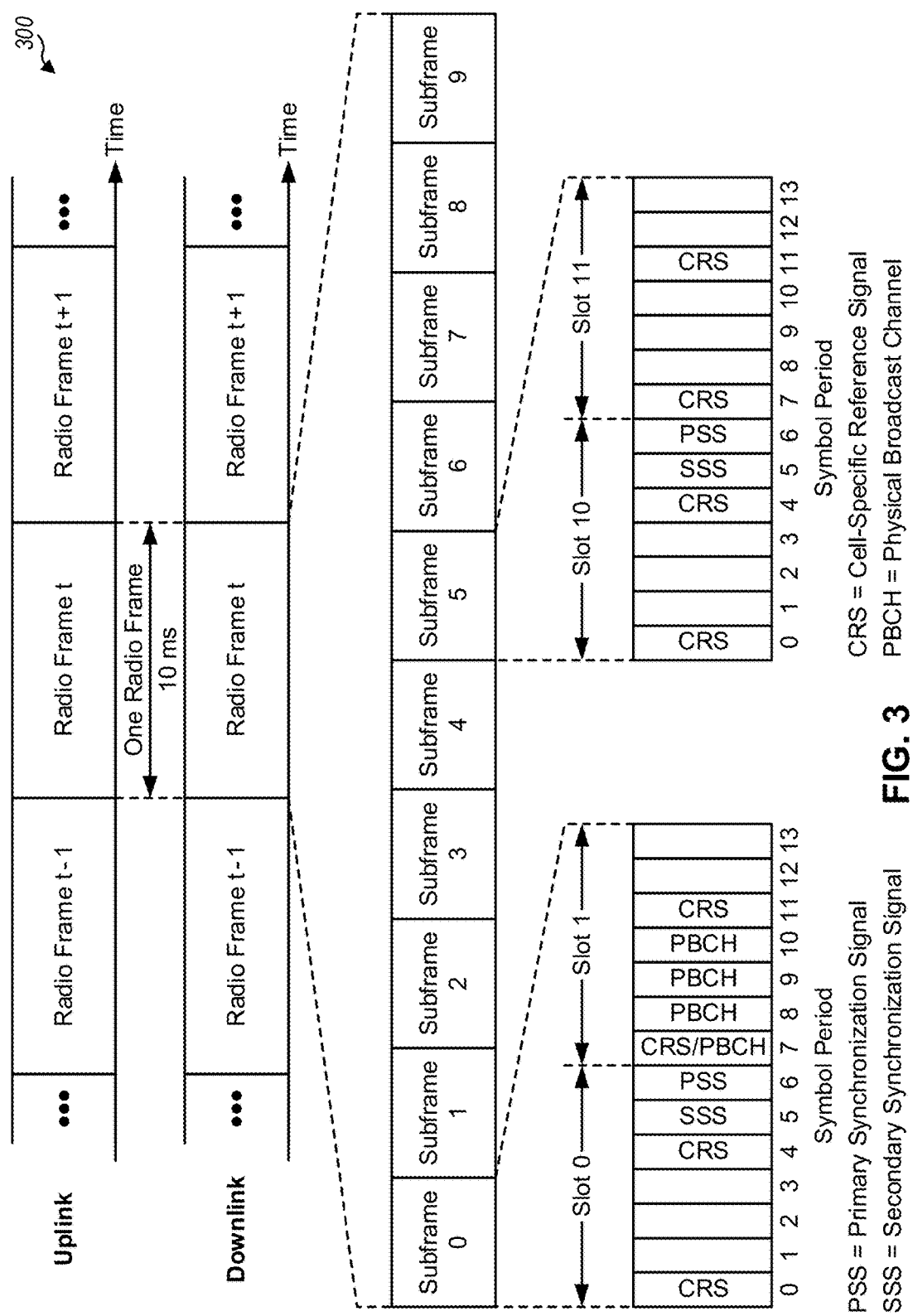
FIG. 3 is a diagram illustrating an example of a frame structure in a wireless communication network.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
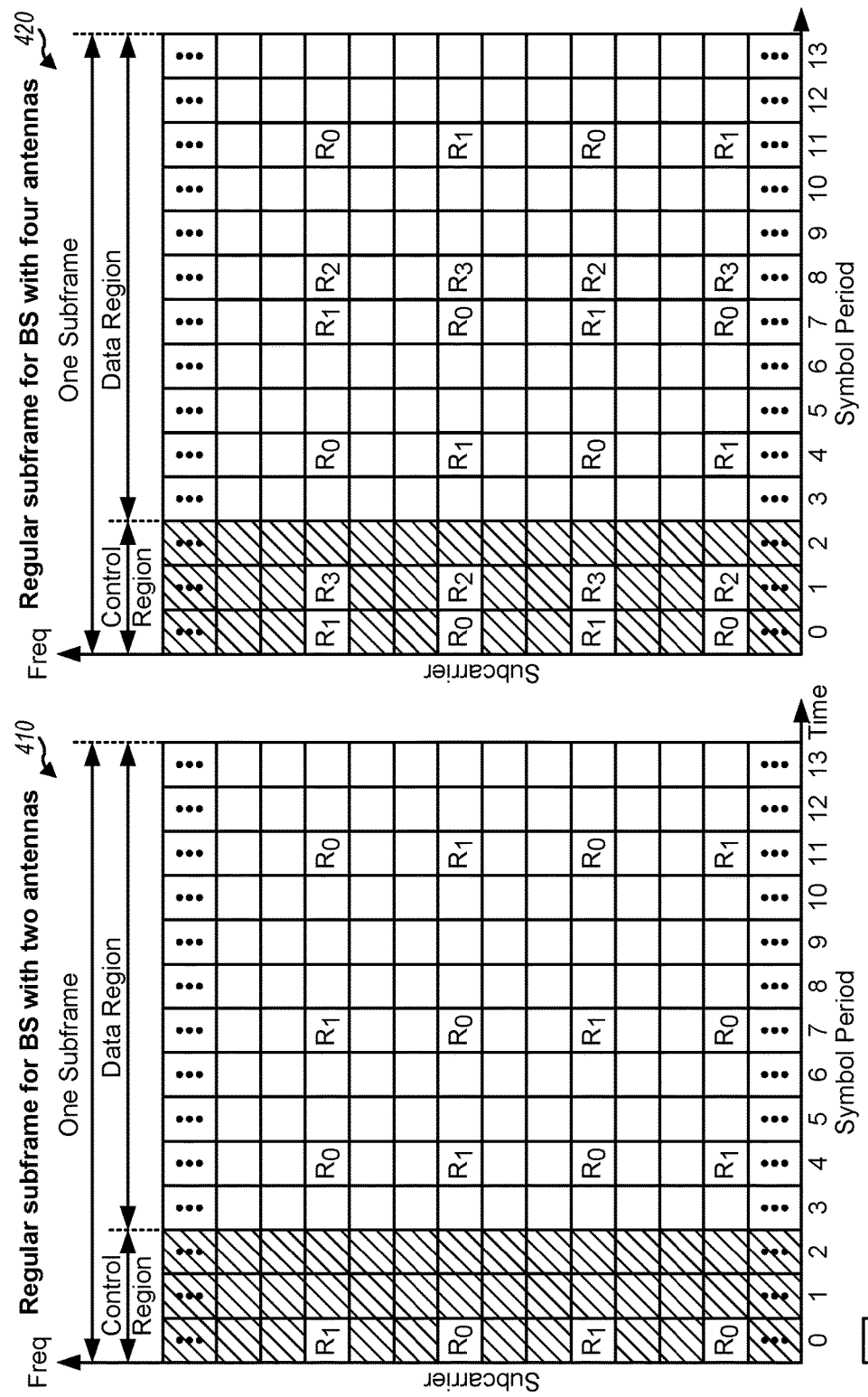
FIG. 4 is a diagram illustrating two example subframe formats with the normal cyclic prefix.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, and/or the like, where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize orthogonal frequency division multiplexing (OFDM) with a cyclic prefix (CP) (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
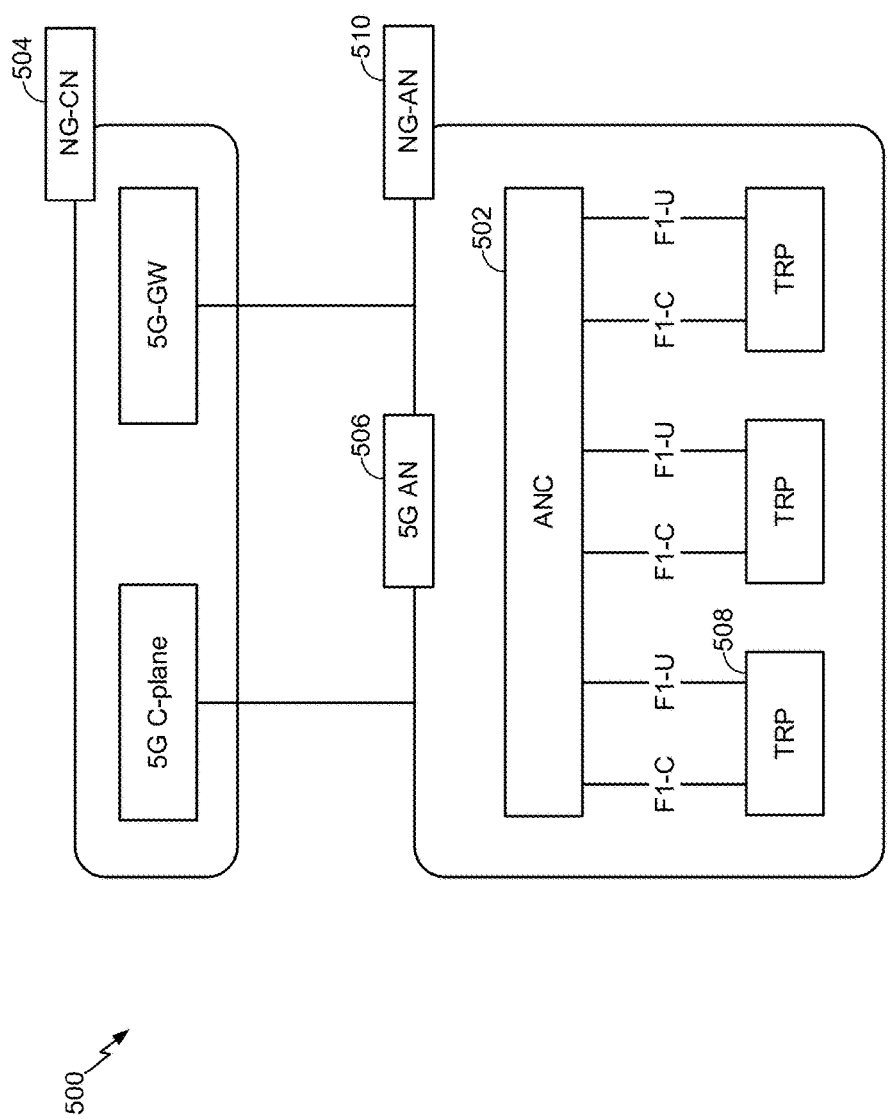
FIG. 5 is a diagram illustrating an example logical architecture of a distributed radio access network (RAN).

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
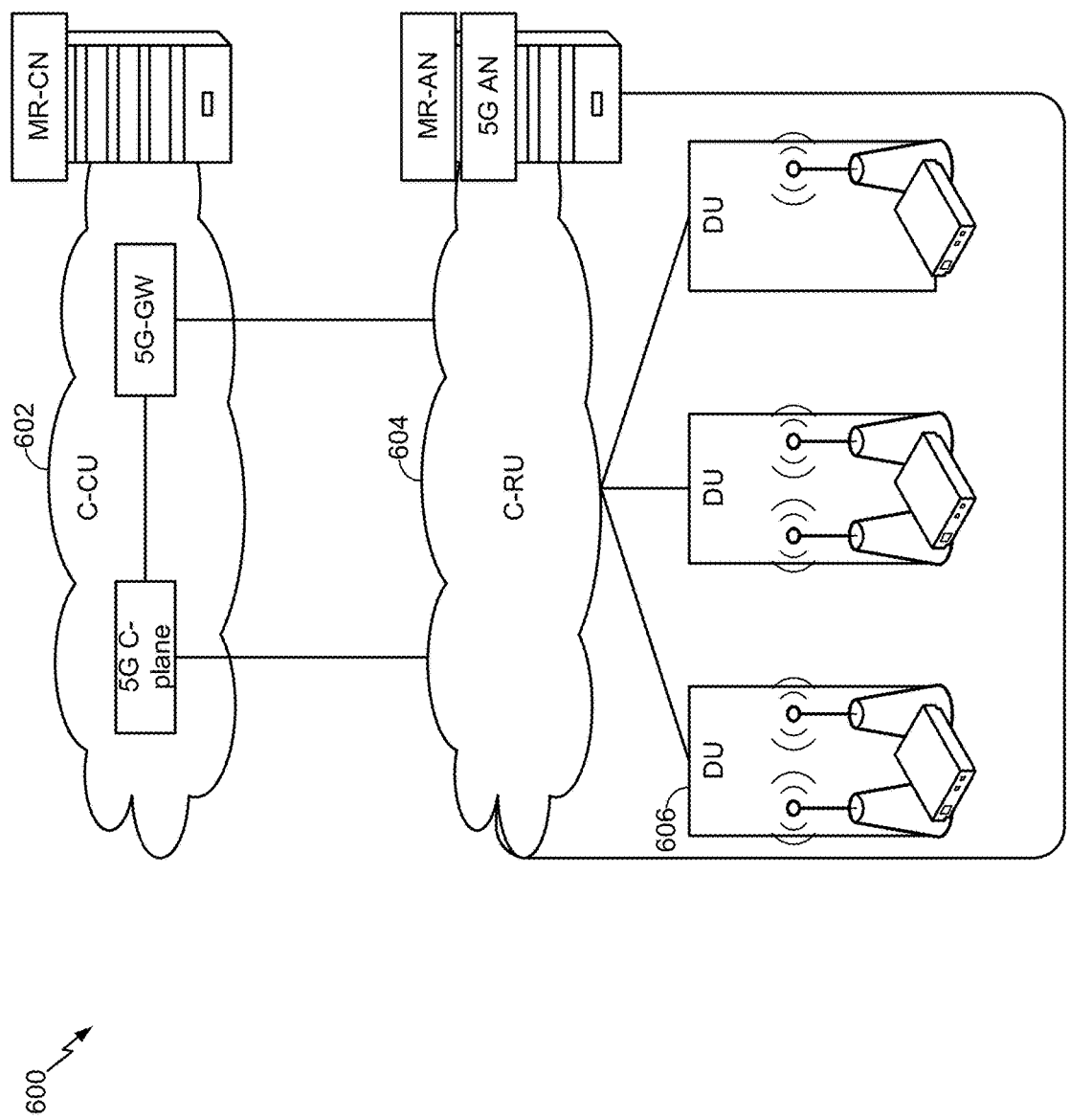
FIG. 6 is a diagram illustrating an example physical architecture of a distributed RAN.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
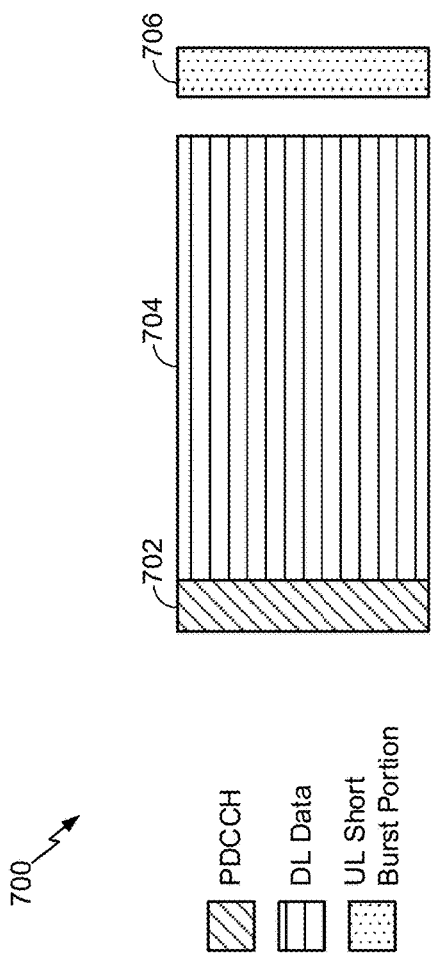
FIG. 7 is a diagram illustrating an example of a downlink (DL)-centric wireless communication structure.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

In some aspects, the DL data portion may be associated with a particular traffic type, such as eMBB traffic, and/or the like. In such a case, the DL data portion may be punctured or interrupted by traffic associated with a higher priority or a lower latency requirement, such as URLLC traffic and/or the like, as described in more detail in connection with FIGS. 9-11, below.

As indicated above, FIG. 7 is provided merely as an example. Other examples are possible and may differ from what was described with regard to FIG. 7.

Figure 8:
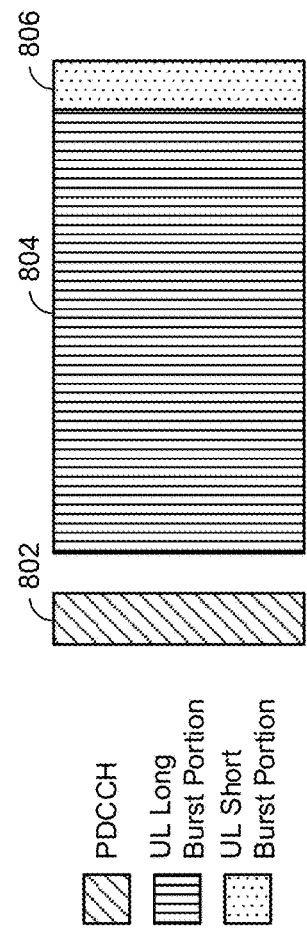
FIG. 8 is a diagram illustrating an example of an uplink (UL)-centric wireless communication structure.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. In some configurations, the control portion 802 may be a physical DL control channel (PDCCH).

The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). In some aspects, the UL long burst portion 804 may include information relating to an ultra-reliable low latency communication (URLLC), such as a URLLC acknowledgment channel, as described in more detail in connection with FIGS. 9-11, below.

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure and alternative structures having similar features may exist without necessarily deviating from the aspects described herein.

As indicated above, FIG. 8 is provided merely as an example. Other examples are possible and may differ from what was described with regard to FIG. 8.

A BS 110 may provide a cell, and may schedule communications with UEs 120 located within the cell. Some communications may be associated with a higher reliability requirement and/or a lower latency requirement than other communications. For example, URLLC may be implemented as part of NR, and may have higher reliability requirements and/or lower latency requirements than other traffic associated with NR (e.g., enhanced mobile broadband (eMBB) traffic and/or the like) and/or traffic not associated with NR (e.g., LTE traffic and/or the like). The techniques and apparatuses described herein are described in the context of URLLC traffic and eMBB traffic, but are equally applicable for any high-reliability and/or low-latency traffic, and any other type of traffic that may be preempted by the high-reliability and/or low-latency traffic.

In order to share resources of a BS 110 between a URLLC UE 120 (e.g., a UE 120 configured to communicate using URLLC traffic) and an eMBB UE 120 (e.g., a UE 120 configured to communicate using eMBB traffic), the BS 110 may selectively puncture or interrupt transmission of eMBB traffic to provide URLLC traffic with a required latency and/or reliability. For example, waiting until a gap in the eMBB traffic to transmit the URLLC traffic may cause unacceptable delay or latency in the URLLC traffic. Thus, requirements associated with the URLLC traffic are met.

When a URLLC UE 120 fails to decode the URLLC traffic, the URLLC UE 120 may transmit a negative acknowledgment message identifying the URLLC traffic. For example, the URLLC UE 120 may fail to decode the URLLC traffic due to an interfering signal from a neighboring BS 110 that continues to transmit signals as the URLLC traffic is transmitted to the URLLC UE 120. A serving BS 110, associated with the URLLC UE 120, may retransmit the URLLC traffic based at least in part on the negative acknowledgment message.

However, the transmission of the URLLC traffic and the retransmission of the URLLC traffic may occur in close time proximity. For example, the transmission and retransmission may both occur within a single subframe, slot, or frame of the interfering signal. Therefore, the retransmission of the URLLC traffic may be likely to be interrupted or degraded by the interfering signal in the same fashion as the transmission of the URLLC traffic. This may lead to degraded performance of the URLLC traffic.

Techniques and apparatuses, described herein, identify at least one resource (e.g., resource block, subframe, time interval, frequency block, slot, mini-slot, and/or the like) in which a retransmission of URLLC traffic is to be transmitted by a first BS 110, and reduce a transmission power of a second BS 110 in the at least one resource block. Thus, an interfering signal transmitted by the second BS 110 is reduced or eliminated during the at least one resource, which improves a likelihood that retransmission of the URLLC traffic by the first BS 110 is successful. In this way, reliability and latency requirements of the URLLC traffic may be satisfied in a situation where a URLLC UE 120 experiences interference from one or more BS 110.

Figure 9:
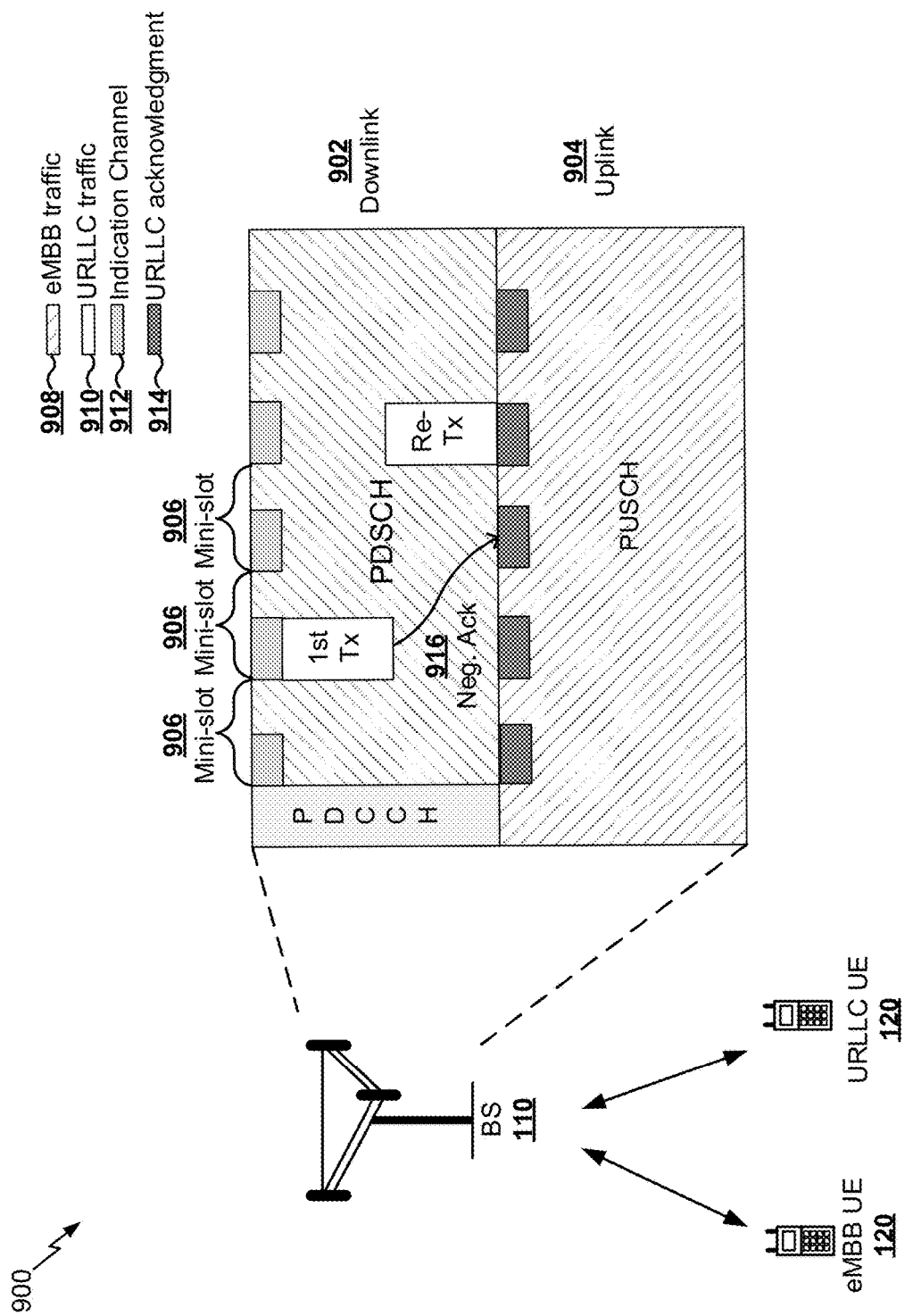
FIG. 9 is a diagram illustrating an example of a wireless communication structure for URLLC traffic and eMBB traffic.

FIG. 9 is a diagram illustrating an example 900 of a wireless communication structure for URLLC traffic and eMBB traffic. For example, the wireless communication structure may include a subframe that is based at least in part on a numerology associated with eMBB traffic. In such a case, the subframe may be 500 ms in length. As shown, a BS 110 may communicate with an eMBB UE 120 and a URLLC UE 120 based at least in part on the wireless communication structure. For example, the BS 110 may communicate eMBB traffic with the eMBB UE 120, and may communicate URLLC traffic with the URLLC UE 120.

As shown, the wireless communication structure may include a downlink portion 902 and an uplink portion 904. Downlink portion 902 may be similar to the DL-centric subframe or wireless communication structure shown in FIG. 7. For example, downlink portion 902 may include control information, such as a PDCCH. Uplink portion 904 may be similar to the UL-centric subframe or wireless communication structure shown in FIG. 8.

As shown by reference number 906, the wireless communication structure may include one or more mini-slots. Here, the wireless communication structure includes five mini-slots. For example, the wireless communication structure may be divided into five mini-slots, and each mini-slot may include two symbols. In FIG. 9, the two rightmost mini-slots are not labelled.

As shown by reference number 908, the downlink portion 902 and/or the uplink portion 904 may include eMBB traffic. The eMBB traffic may be provided to or received from UEs 120 that are located within a cell provided by the BS 110. For example, the eMBB traffic may be provided at a first reliability level and/or a first latency.

As shown by reference number reference number 910, the eMBB traffic on the downlink portion 902 may be punctured or replaced by URLLC traffic. For example, the URLLC traffic may be associated with a second reliability level that is higher than the first reliability level and/or a second latency that is lower than the first latency. Therefore, when the BS 110 receives URLLC traffic to be provided to a URLLC UE 120, the BS 110 may puncture the eMBB traffic so that the URLLC traffic can be provided in accordance with the second reliability level and/or the second latency. In some aspects, the BS 110 may provide an indicator in an indication channel 912 to indicate, to an eMBB UE 120, that the eMBB traffic in a particular mini-slot will be punctured or replaced by the URLLC traffic.

As shown, the URLLC traffic includes a first transmission (e.g., 1st Tx) and a retransmission (e.g., Re-Tx). Assume that the retransmission is a retransmission corresponding to the first transmission. For example, the URLLC UE 120 may fail to decode the first transmission, and the BS 110 may provide the retransmission so that the URLLC traffic is provided to the URLLC UE 120 within the requirements associated with URLLC traffic. In some aspects, the BS 110 may determine that the retransmission is to be provided based at least in part on a URLLC acknowledgment channel included in the uplink portion 904, shown by reference number 914. For example, as shown by reference number 916, the URLLC UE 120 may provide a negative acknowledgment message in a next URLLC acknowledgment channel to indicate that decoding of the first transmission was unsuccessful. In such a case, and as shown, the BS 110 may provide the retransmission in a next mini-slot after receiving the negative acknowledgment message.

However, since the first transmission and the retransmission are provided in a same eMBB subframe, channel conditions that contributed to interference with the first transmission may still exist when the retransmission is transmitted. For example, the channel conditions may be caused by a neighboring BS 110, as described in more detail in connection with FIG. 10. In such a case, unsuccessful decoding of the retransmission may occur due to the interference. This, in turn, may lead to violation of latency and/or reliability requirements associated with the URLLC traffic.

As indicated above, FIG. 9 is provided as example. Other examples are possible and may differ from what was described with respect to FIG. 9.

Figure 10:
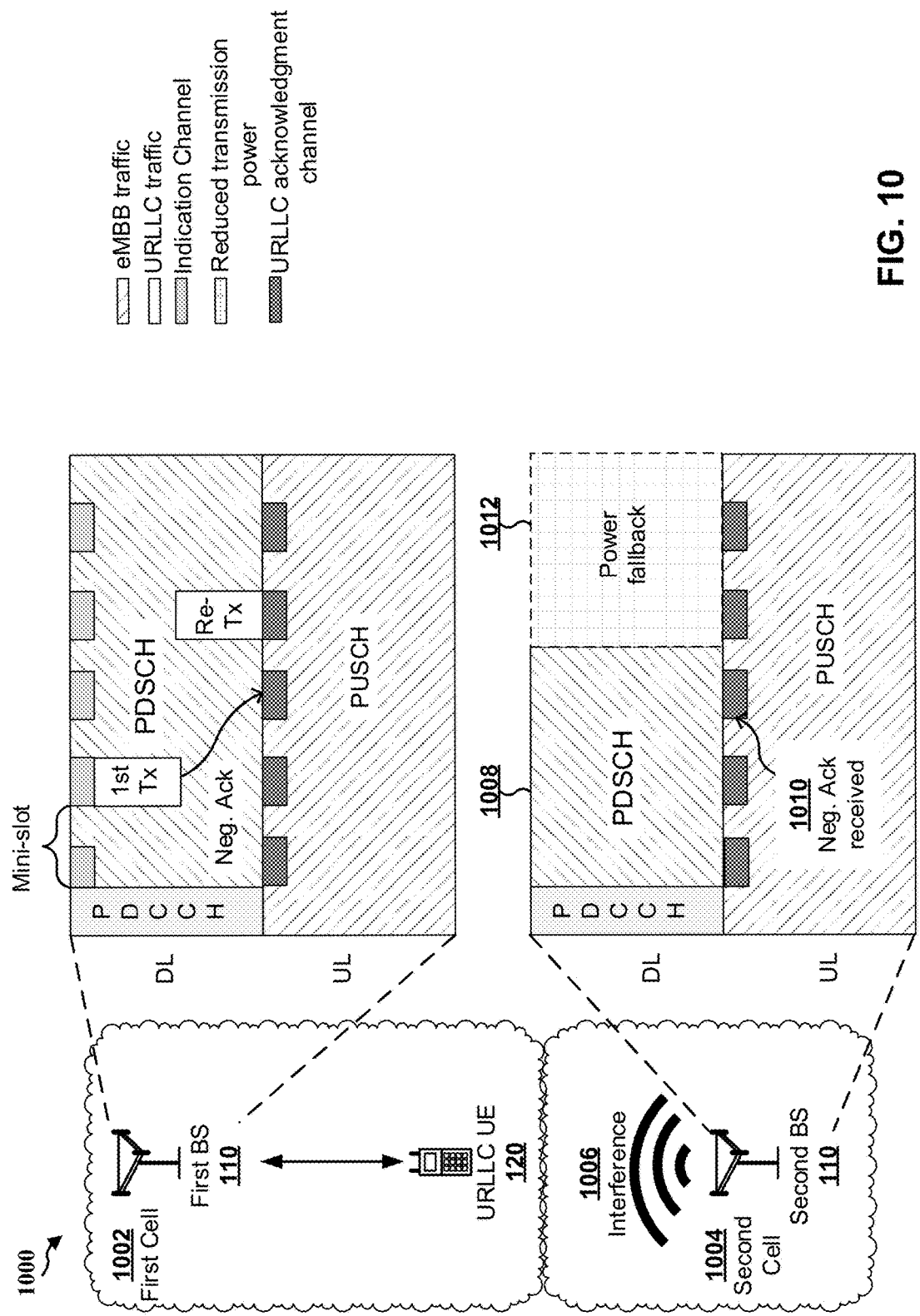
FIG. 10 is a diagram illustrating an example of reducing transmission power of a second base station to reduce interference with URLLC transmissions of a first base station.

FIG. 10 is a diagram illustrating an example 1000 of reducing transmission power of a second base station to reduce interference with URLLC transmissions of a first base station. As shown, example 1000 includes a first cell 1002 provided by a first BS 110 and a second cell 1004 provided by a second BS 110. The wireless communication structures depicted in association with first BS 110 and second BS 110 may correspond to the same time period. For example, traffic associated with the wireless communication structure of first BS 110 may be transmitted at the same time as traffic associated with the wireless communication structure of second BS 110. As further shown, the first cell 1002 includes URLLC UE 120, as described in more detail in connection with FIG. 9, above.

For the purpose of FIG. 10, assume that a first transmission of URLLC traffic to the URLLC UE 120 is unsuccessful. In such a case, and as shown, the URLLC UE 120 may transmit a negative acknowledgment message, as described in more detail in connection with FIG. 9, above. As shown by reference number 1006, the second BS 110 may transmit interfering signals. For example, the interfering signals may be associated with eMBB traffic for one or more UEs 120 associated with the second BS 110. As another example, and as shown by reference number 1008, the interfering signals may be associated with a PDSCH of the second BS 110. The interfering signals may cause the URLLC UE 120 to fail to decode the first transmission. For example, the URLLC UE 120 may be located within range of the interfering signals, and may, thereby, fail to decode the first transmission due to the interfering signals.

As shown by reference number 1010, the second BS 110 may receive the negative acknowledgment message transmitted by the URLLC UE 120, as communication information, on a negative acknowledgment channel. For example, the second BS 110 may receive the negative acknowledgment message based at least in part on the URLLC UE 120 being within range of the interfering signals. As shown by reference number 1012, the second BS 110 may reduce transmission power based at least in part on receiving the negative acknowledgment message, which is shown here as "power fallback." In some aspects, the second BS 110 may reduce the transmission power to zero, or may reduce the transmission power to a value higher than zero. In this way, the second BS 110 may reduce interference with the retransmission of the first transmission, thereby improving likelihood that decoding of the retransmission by the URLLC UE 120 is successful.

As further shown, in some aspects, the second BS 110 may reduce the transmission power for an entire remainder of the wireless communication structure and an entire bandwidth of the downlink data channel. In some aspects, the second BS 110 may reduce the transmission power for less than the entire remainder of the wireless communication structure. For example, the second BS 110 may reduce the transmission power during a resource in which the retransmission is to be transmitted, during a mini-slot including the resource in which the retransmission is to be transmitted, and/or the like. This may reduce an impact of the transmission power reduction on performance of the second BS 110. Additionally, or alternatively, the second BS 110 may reduce the transmission power in less than all of a bandwidth of the downlink data channel. For example, the second BS 110 may reduce the transmission power in a bandwidth of the downlink data channel in which the retransmission is to be transmitted, which reduces an impact of the transmission power reduction on performance of the second BS 110. In some aspects, the second BS 110 may receive communication information that identifies one or more resources in which the transmission power is to be reduced. For example, the first BS 110 may provide communication information identifying the one or more resources.

In some aspects, the second BS 110 may monitor the URLLC acknowledgment channels based at least in part on communication information, received from the first BS 110, indicating that the URLLC acknowledgment channels are to be monitored. For example, the first BS 110 may provide the communication information to nearby BSs 110 (e.g., the second BS 110 and/or another nearby BS 110 that may provide an interfering signal) when the first BS 110 detects a URLLC UE 120 located within a cell provided by the first BS 110. In this way, the second BS 110 may be configured to monitor the URLLC acknowledgment channels when interference with a URLLC UE 120 is likely to occur, thereby conserving resources of the second BS 110 that would otherwise be used to monitor the URLLC acknowledgment channels when interference is not likely to occur, such as when a URLLC UE 120 is not located within the cell provided by the first BS 110.

As indicated above, FIG. 10 is provided as example. Other examples are possible and may differ from what was described with respect to FIG. 10.

Figure 11:
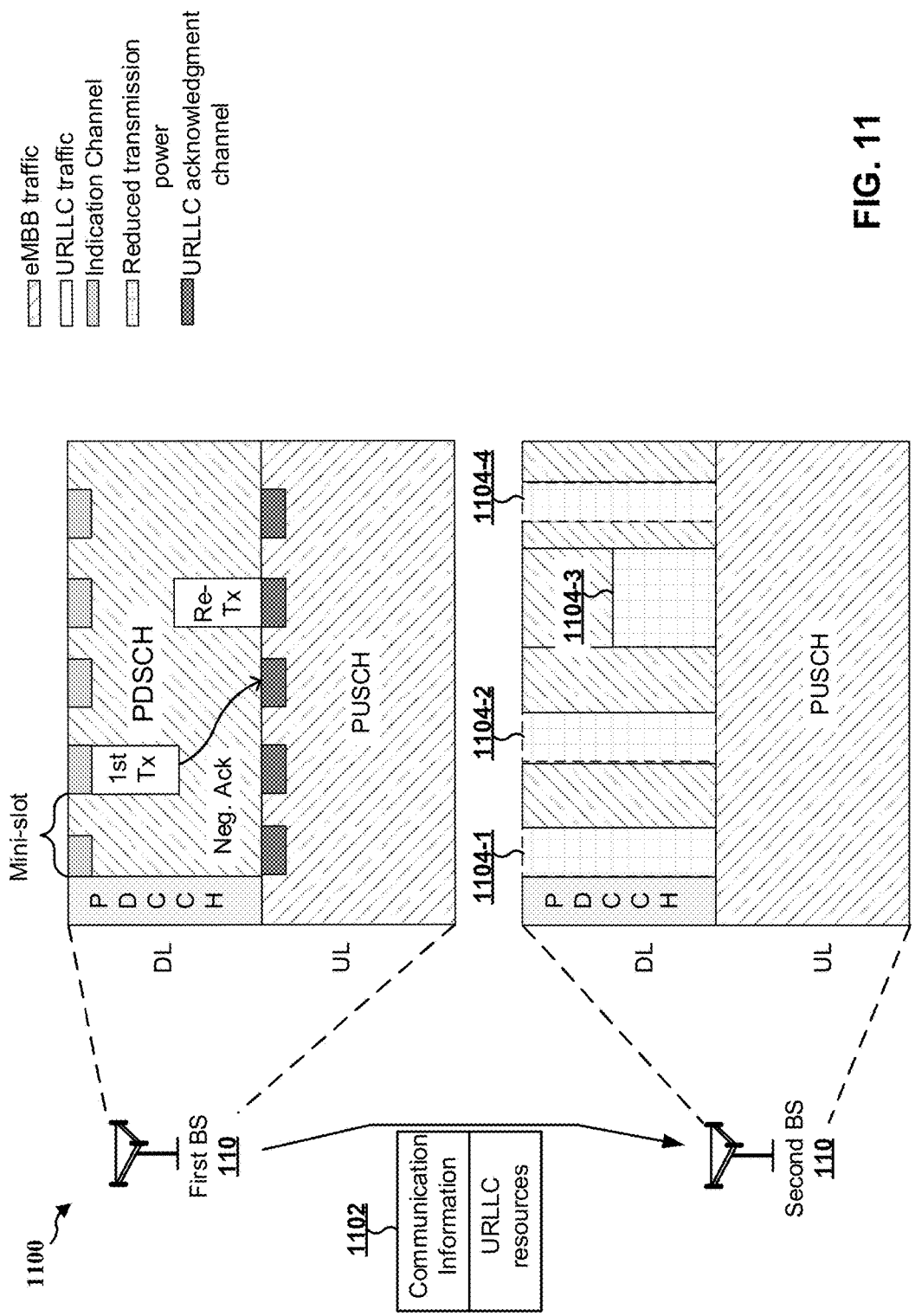
FIG. 11 is a diagram illustrating another example of reducing transmission power of a second base station to reduce interference with URLLC transmissions of a first base station.

FIG. 11 is a diagram illustrating another example 1100 of reducing transmission power of a second base station to reduce interference with URLLC transmissions of a first base station.

As shown in FIG. 11, and by reference number 1102, a first BS 110 may provide communication information to a second BS 110. As further shown, the communication information may identify at least one resource associated with URLLC traffic. In some aspects, the at least one resource may be associated with a first transmission of the URLLC traffic and/or a retransmission of the URLLC traffic. By providing the communication information identifying the at least one resource, the first BS 110 enables the second BS 110 to reduce transmission power during the at least one resource, thereby reducing interference with the URLLC traffic.

As shown by reference numbers 1104-1 through 1104-4, the second BS 110 may reduce transmission power during the at least one resource. For example, the second BS 110 may reduce the transmission power irrespective of whether the transmission and/or retransmission of the URLLC traffic occurs, which conserves resources of the second BS 110 that would otherwise be used to determine whether the transmission and/or retransmission of the URLLC traffic occurs. In some aspects, as shown by reference numbers 1104-1, 1104-2, and 1104-4, the second BS 110 may reduce the transmission power in an entire bandwidth of the downlink channel. In some aspects, as shown by reference number 1104-3, the BS 110 may reduce the transmission power in a portion of the downlink channel. Here, the portion of the downlink channel corresponds to at least one resource associated with the retransmission of the URLLC traffic. In this way, the second BS 110 reduces interference with signals associated with the URLLC traffic by signals transmitted by the second BS 110 (e.g., signals associated with eMBB traffic and/or the like).

As indicated above, FIG. 11 is provided as example. Other examples are possible and may differ from what was described with respect to FIG. 11.

Figure 12:
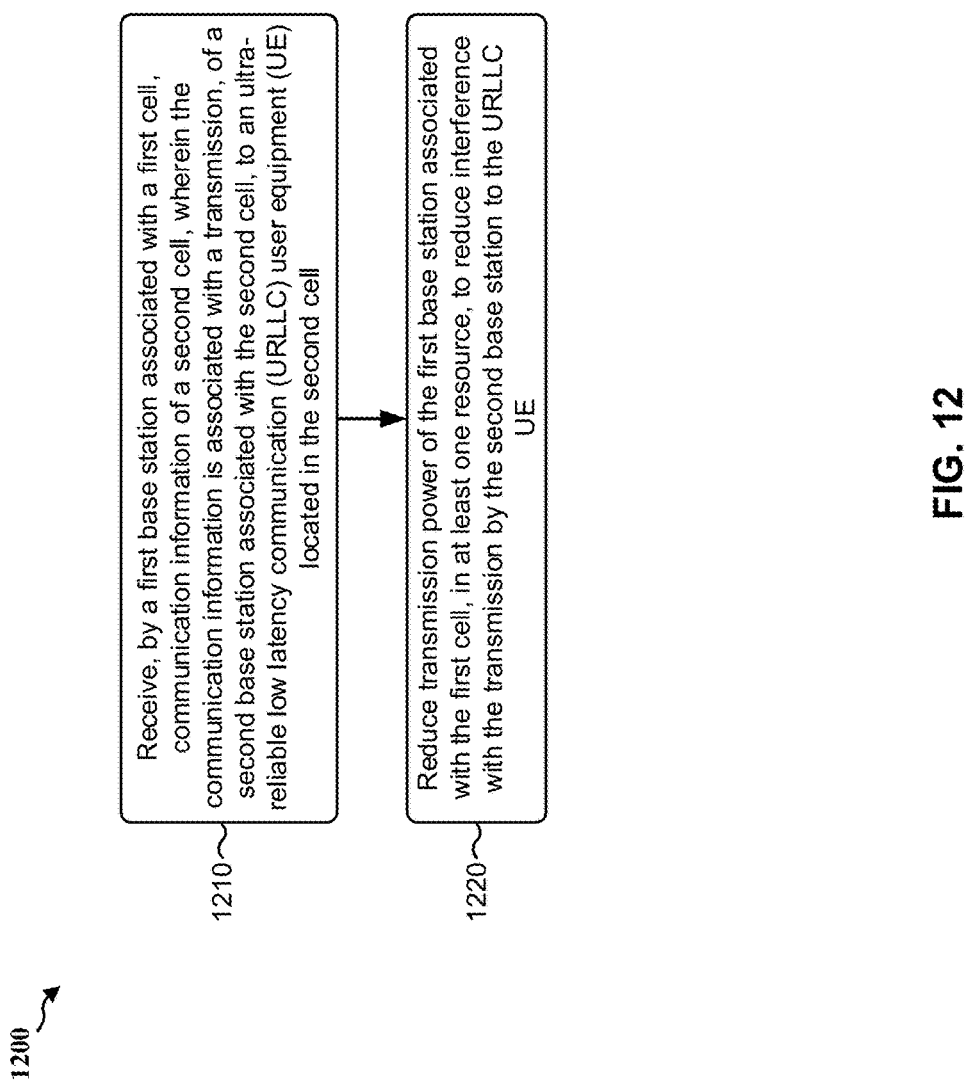
FIG. 12 is a flow chart of an example process of wireless communication.

FIG. 12 is a flow chart of a method 1200 of wireless communication. The method may be performed by a first base station associated with a first cell (e.g., the BS 110 of FIG. 1 and/or the like).

At 1210, the first base station may receive communication information of a second cell, wherein the communication information is associated with a transmission, of a second base station associated with the second cell, to an ultra-reliable low latency communication (URLLC) user equipment (UE) located in the second cell. For example, the first base station may receive communication information from the second base station. The communication information may be associated with a transmission to a URLLC UE (e.g., the UE 120 and/or the like). The URLLC UE may be located in the second cell.

At 1220, the first base station may reduce transmission power of the first base station associated with the first cell, in at least one resource, to reduce interference with the transmission by the second base station to the URLLC UE. For example, the first base station may reduce transmission power in at least one resource. In some aspects, the at least one resource may be identified by the communication information. By reducing the transmission power, the BS 110 reduces interference with transmission to the URLLC UE.

In some aspects, the communication information may include a negative acknowledgment message that is related to the transmission and that is transmitted by the URLLC UE. In some aspects, the communication information may be received in at least one particular resource, wherein the at least one particular resource is designated for acknowledgment or negative acknowledgment messages for URLLC traffic. In some aspects, the first base station may monitor the at least one particular resource based at least in part on the second cell being associated with the URLLC UE.

In some aspects, the transmission power is reduced for an entire remainder of a slot, subframe, or frame in which the communication information is received. In some aspects, the transmission power is reduced for less than an entire remainder of a slot, subframe, or frame in which the communication information is received. In some aspects, the transmission power may be reduced to zero.

In some aspects, the at least one resource includes multiple sets of resources. The transmission power may be reduced in each set of resources of the multiple sets of resources. In some aspects, at least one particular resource, of the multiple sets of resources, is associated with at least one of a first transmission of the transmission, or a retransmission of the transmission. In some aspects, at least one particular resource, of the multiple sets of resources, may be determined based at least in part on a traffic profile for URLLC traffic associated with the URLLC UE. In some aspects, the at least one resource may include at least one of a resource block, a sub-band, or a mini-slot.

In some aspects, the communication information may be associated with enabling or disabling a monitoring process on the first base station. In some aspects, the communication information may be received from the second base station associated with the second cell based at least in part on the URLLC UE being located in the second cell. In some aspects, the communication information may be received on a backhaul network.

Although FIG. 12 shows example blocks of a method of wireless communication, in some aspects, the method may include additional blocks, fewer blocks, different blocks, or differently arranged blocks than those shown in FIG. 12. Additionally, or alternatively, two or more blocks shown in FIG. 12 may be performed in parallel.

Figure 13:
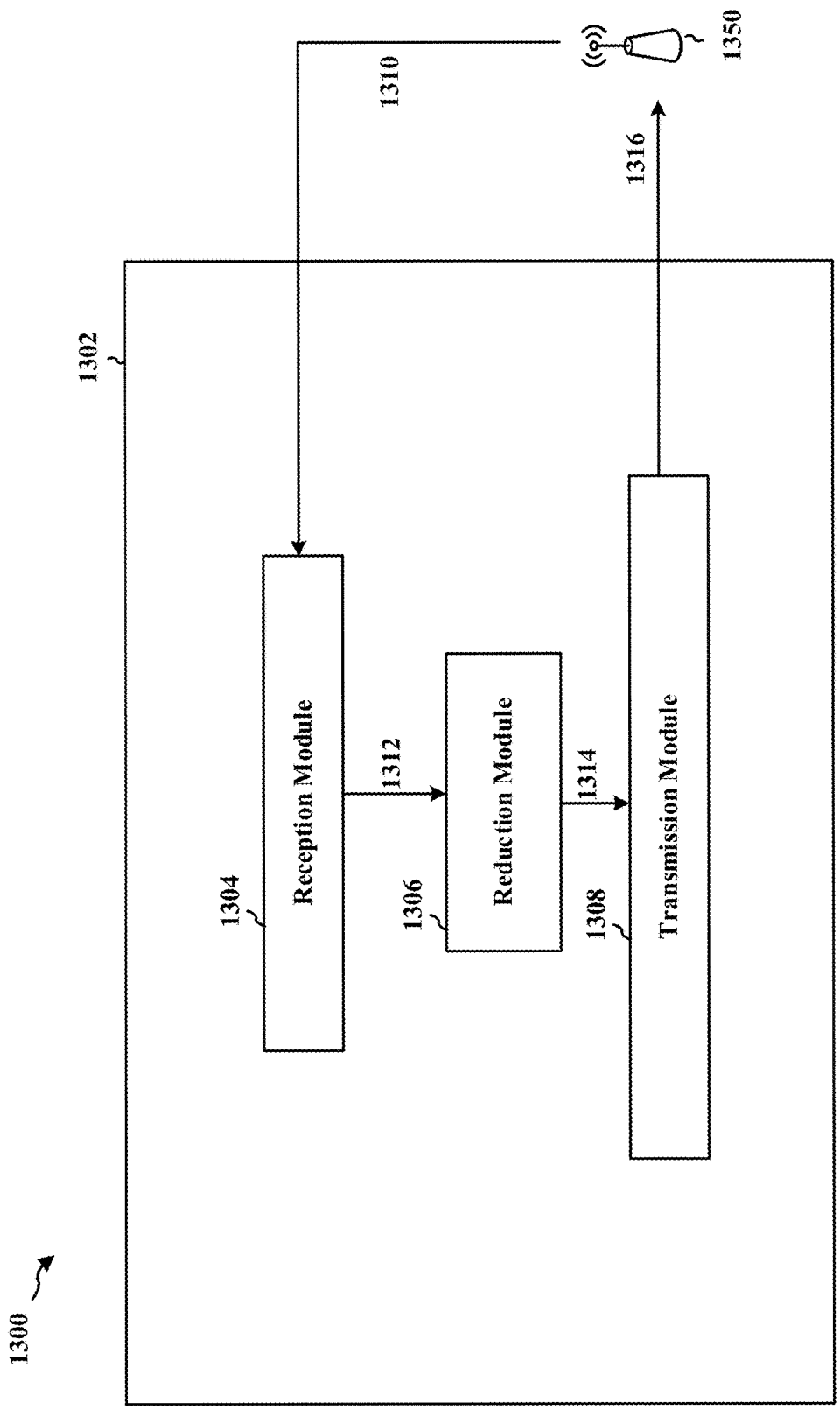
FIG. 13 is a conceptual data flow diagram illustrating the data flow between different modules/means/components in an example apparatus.

FIG. 13 is a conceptual data flow diagram 1300 illustrating the data flow between different modules/means/components in an example apparatus 1302. The apparatus 1302 may be a base station (e.g., the BS 110 and/or the like). In some aspects, the apparatus 1302 may be a user equipment (e.g., the UE 120 and/or the like). In some aspects, the apparatus 1302 includes a reception module 1304, a reduction module 1306, and/or a transmission module 1308.

The reception module 1304 may receive signals 1310 from a wireless communication device 1350 (e.g., a BS 110 and/or a UE 120). The signals 1310 may include communication information and/or the like. The reception module 1304 may provide data 1312 to the reduction module 1306. The data 1312 may include the communication information and/or the like. The reduction module 1306 may reduce a transmission power of the transmission module 1308 based at least in part on the data 1312. For example, the reduction module 1306 may provide data 1314 to the transmission module 1308 to configure transmission power of the transmission module 1308 to be reduced. The transmission module 1308 may transmit signals 1316 at reduced transmission power based at least in part on the data 1314.

The apparatus may include additional modules that perform each of the blocks of the algorithm in the aforementioned flow chart of FIG. 12. As such, each block in the aforementioned flow chart of FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 13 are provided as an example. In practice, there may be additional modules, fewer modules, different modules, or differently arranged modules than those shown in FIG. 13. Furthermore, two or more modules shown in FIG. 13 may be implemented within a single module, or a single module shown in FIG. 13 may be implemented as multiple, distributed modules. Additionally, or alternatively, a set of modules (e.g., one or more modules) shown in FIG. 13 may perform one or more functions described as being performed by another set of modules shown in FIG. 13.

Figure 14:
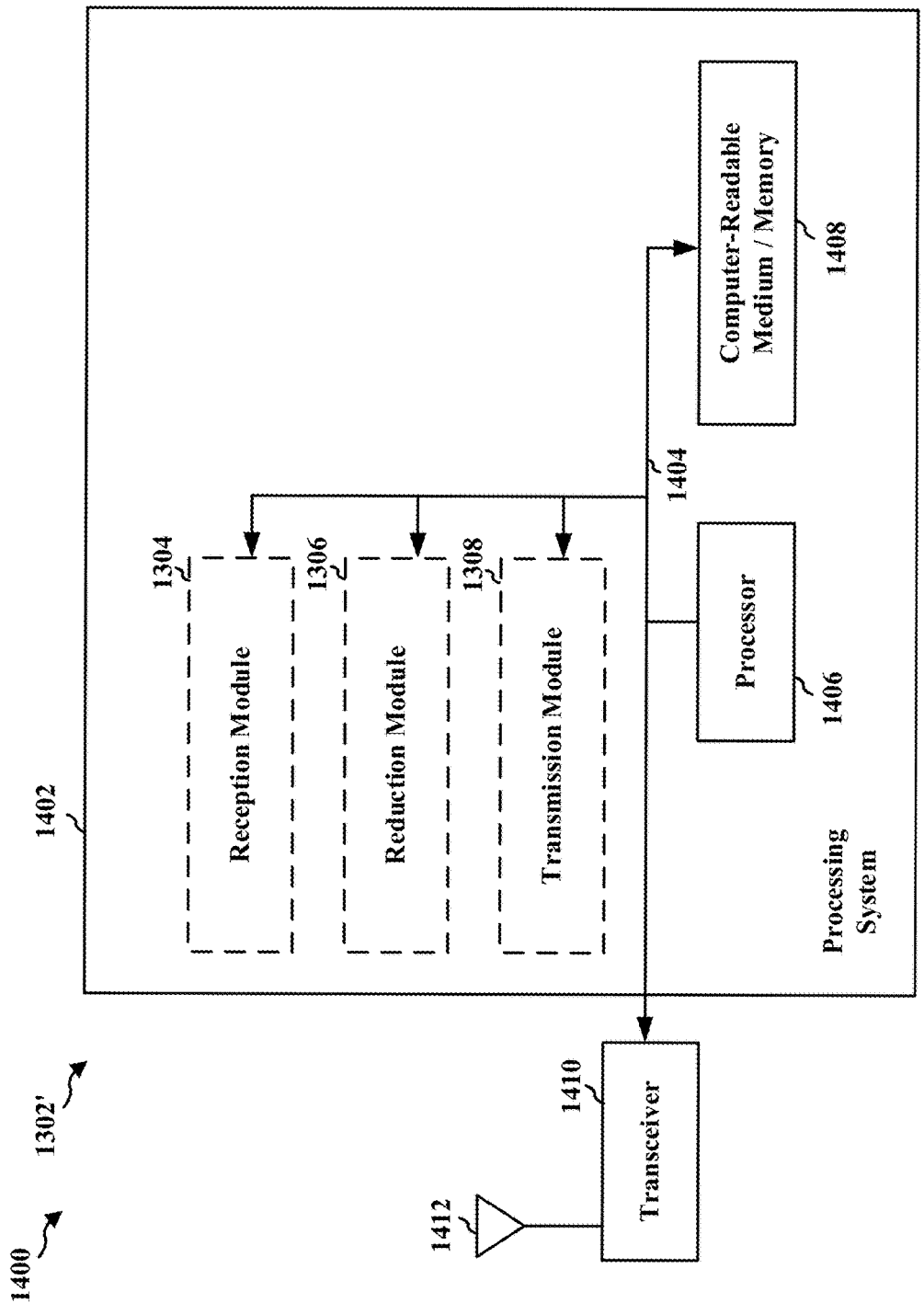
FIG. 14 is a diagram illustrating an example of a hardware implementation for an apparatus employing a processing system.

FIG. 14 is a diagram 1400 illustrating an example of a hardware implementation for an apparatus 1302' employing a processing system 1402. The apparatus 1302' may be a base station (e.g., the BS 110 and/or the like). In some aspects, the apparatus 1302' may be a user equipment (e.g., the UE 120 and/or the like).

The processing system 1402 may be implemented with a bus architecture, represented generally by the bus 1404. The bus 1404 may include any number of interconnecting buses and bridges depending on the specific application of the processing system 1402 and the overall design constraints. The bus 1404 links together various circuits including one or more processors and/or hardware modules, represented by the processor 1406, the modules 1304, 1306, 1308, and the computer-readable medium/memory 1408. The bus 1404 may also link various other circuits such as timing sources, peripherals, voltage regulators, and power management circuits, which are well known in the art, and therefore, will not be described any further.

The processing system 1402 may be coupled to a transceiver 1410. The transceiver 1410 is coupled to one or more antennas 1412. The transceiver 1410 provides a means for communicating with various other apparatus over a transmission medium. The transceiver 1410 receives a signal from the one or more antennas 1412, extracts information from the received signal, and provides the extracted information to the processing system 1402, specifically the reception module 1304. In addition, the transceiver 1410 receives information from the processing system 1402, specifically the transmission module 1308, and based at least in part on the received information, generates a signal to be applied to the one or more antennas 1412. The processing system 1402 includes a processor 1406 coupled to a computer-readable medium/memory 1408. The processor 1406 is responsible for general processing, including the execution of software stored on the computer-readable medium/memory 1408. The software, when executed by the processor 1406, causes the processing system 1402 to perform the various functions described supra for any particular apparatus. The computer-readable medium/memory 1408 may also be used for storing data that is manipulated by the processor 1406 when executing software. The processing system further includes at least one of the modules 1304, 1306, and 1308. The modules may be software modules running in the processor 1406, resident/stored in the computer readable medium/memory 1408, one or more hardware modules coupled to the processor 1406, or some combination thereof. The processing system 1402 may be a component of the BS 110 and may include the memory 242 and/or at least one of the TX MIMO processor 230, the receive processor 238, and/or the controller/processor 240.

In some aspects, the apparatus 1302/1302' for wireless communication includes means for receiving communication information of a second cell and means for reducing transmission power. The aforementioned means may be one or more of the aforementioned modules of the apparatus 1302 and/or the processing system 1402 of the apparatus 1302' configured to perform the functions recited by the aforementioned means. As described supra, the processing system 1402 may include the TX MIMO processor 230, the receive processor 238, and/or the controller/processor 240. As such, in one configuration, the aforementioned means may be the TX MIMO processor 230, the receive processor 238, and/or the controller/processor 240 configured to perform the functions recited by the aforementioned means.

FIG. 14 is provided as an example. Other examples are possible and may differ from what was described in connection with FIG. 14.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
    receiving, by a first base station associated with a first cell, communication information of a second cell,
        wherein the communication information is associated with a transmission, of a second base station associated with the second cell, to an ultra-reliable low latency communication (URLLC) user equipment (UE) located in the second cell; and
    reducing transmission power of the first base station associated with the first cell, in at least one resource, to reduce interference with the transmission by the second base station to the URLLC UE,
        wherein the transmission power is reduced for at least a portion of an entire remainder of a slot, subframe, or frame in which the communication information is received.

2. The method of claim 1, wherein the communication information includes a negative acknowledgment message that is related to the transmission and that is transmitted by the URLLC UE.

3. The method of claim 1, wherein the communication information is received in at least one particular resource,
    wherein the at least one particular resource is designated for acknowledgment or negative acknowledgment messages for URLLC traffic.

4. The method of claim 3, wherein the first base station is configured to monitor the at least one particular resource based at least in part on the second cell being associated with the URLLC UE.

5. The method of claim 1, wherein the transmission power is reduced for the entire remainder of the slot, subframe, or frame in which the communication information is received.

6. The method of claim 1, wherein the transmission power is reduced for less than the entire remainder of the slot, subframe, or frame in which the communication information is received.

7. The method of claim 1, wherein the transmission power is reduced to zero.

8. The method of claim 1, wherein the at least one resource includes multiple sets of resources,
    wherein the transmission power is reduced in each set of resources of the multiple sets of resources.

9. The method of claim 8, wherein at least one particular resource, of the multiple sets of resources, is associated with at least one of:
    a first transmission of the transmission, or
    a retransmission of the transmission.

10. The method of claim 8, wherein at least one particular resource, of the multiple sets of resources, is determined based at least in part on a traffic profile for URLLC traffic associated with the URLLC UE.

11. The method of claim 1, wherein the at least one resource includes at least one of:
    a resource block,
    a sub-band, or
    a mini-slot.

12. The method of claim 1, wherein the communication information is associated with enabling or disabling a monitoring process on the first base station.

13. The method of claim 1, wherein the communication information is received from the second base station associated with the second cell based at least in part on the URLLC UE being located in the second cell.

14. The method of claim 1, wherein the communication information is received on a backhaul network.

15. A first base station for wireless communication, comprising:
    a memory; and
    at least one processor operatively configured to the memory, the at least one processor configured to:
        receive communication information of a second cell,
            wherein the first base station is associated with a first cell, and wherein the communication information is associated with a transmission, of a second base station associated with the second cell, to an ultra-reliable low latency communication (URLLC) user equipment (UE) located in the second cell; and
reduce transmission power in at least one resource to reduce interference with the transmission by the second base station to the URLLC UE,
wherein the transmission power is reduced for at least a portion of an entire remainder of a slot, subframe, or frame in which the communication information is received.

16. The first base station of claim 15, wherein the communication information includes a negative acknowledgment message that is related to the transmission and that is transmitted by the URLLC UE.

17. The first base station of claim 15, wherein the communication information is received in at least one particular resource,
wherein the at least one particular resource is designated for acknowledgment or negative acknowledgment messages for URLLC traffic.

18. The first base station of claim 17, wherein the at least one processor is configured to monitor the at least one particular resource based at least in part on the second cell being associated with the URLLC UE.

19. The first base station of claim 15, wherein the transmission power is reduced for the entire remainder of the slot, subframe, or frame in which the communication information is received.

20. The first base station of claim 15, wherein the transmission power is reduced for less than the entire remainder of the slot, subframe, or frame in which the communication information is received.

21. The first base station of claim 15, wherein the transmission power is reduced to zero.

22. The first base station of claim 15, wherein the at least one resource includes multiple sets of resources,
wherein the transmission power is reduced in each set of resources of the multiple sets of resources.

23. The first base station of claim 22, wherein at least one particular resource, of the multiple sets of resources, is associated with at least one of:
a first transmission of the transmission, or
a retransmission of the transmission.

24. The first base station of claim 22, wherein at least one particular resource, of the multiple sets of resources, is determined based at least in part on a traffic profile for URLLC traffic associated with the URLLC UE.

25. The first base station of claim 15, wherein the at least one resource includes at least one of:
a resource block,
a sub-band, or
a mini-slot.

26. The first base station of claim 15, wherein the communication information is associated with enabling or disabling a monitoring process on the first base station.

27. The first base station of claim 15, wherein the communication information is received from the second base station associated with the second cell based at least in part on the URLLC UE being located in the second cell.

28. The first base station of claim 15, wherein the communication information is received on a backhaul network.

29. A non-transitory computer-readable medium storing one or more instructions for wireless communication, the one or more instructions comprising:
one or more instructions that, when executed by one or more processors of a first base station, cause the one or more processors to:
receive communication information of a second cell,
wherein the first base station is associated with a first cell, and
wherein the communication information is associated with a transmission, of a second base station associated with the second cell, to an ultra-reliable low latency communication (URLLC) user equipment (UE) located in the second cell; and
reduce transmission power in at least one resource to reduce interference with the transmission by the second base station to the URLLC UE,
wherein the transmission power is reduced for at least a portion of an entire remainder of a slot, subframe, or frame in which the communication information is received.

30. The non-transitory computer-readable medium of claim 29, wherein the communication information includes a negative acknowledgment message that is related to the transmission and that is transmitted by the URLLC UE.

31. The non-transitory computer-readable medium of claim 29, wherein the communication information is received in at least one particular resource,
wherein the at least one particular resource is designated for acknowledgment or negative acknowledgment messages for URLLC traffic.

32. The non-transitory computer-readable medium of claim 31, wherein the one or more instructions, when executed by the one or more processors, further cause the one or more processors to monitor the at least one particular resource based at least in part on the second cell being associated with the URLLC UE.

33. The non-transitory computer-readable medium of claim 29, wherein the transmission power is reduced for the entire remainder of the slot, subframe, or frame in which the communication information is received.

34. The non-transitory computer-readable medium of claim 29, wherein the transmission power is reduced for less than the entire remainder of the slot, subframe, or frame in which the communication information is received.

35. The non-transitory computer-readable medium of claim 29, wherein the transmission power is reduced to zero.

36. The non-transitory computer-readable medium of claim 29, wherein the at least one resource includes multiple sets of resources,
wherein the transmission power is reduced in each set of resources of the multiple sets of resources.

37. The non-transitory computer-readable medium of claim 36, wherein at least one particular resource, of the multiple sets of resources, is associated with at least one of:
a first transmission of the transmission, or
a retransmission of the transmission.

38. The non-transitory computer-readable medium of claim 36, wherein at least one particular resource, of the multiple sets of resources, is determined based at least in part on a traffic profile for URLLC traffic associated with the URLLC UE.

39. The non-transitory computer-readable medium of claim 29, wherein the at least one resource includes at least one of:
a resource block,
a sub-band, or
a mini-slot.

40. The non-transitory computer-readable medium of claim 29, wherein the communication information is associated with enabling or disabling a monitoring process on the first base station.

41. The non-transitory computer-readable medium of claim 29, wherein the communication information is received from the second base station associated with the second cell based at least in part on the URLLC UE being located in the second cell.

42. The non-transitory computer-readable medium of claim 29, wherein the communication information is received on a backhaul network.

43. An apparatus for wireless communication, comprising:
  means for receiving communication information of a second cell,
    wherein the apparatus is associated with a first cell, and
    wherein the communication information is associated with a transmission, of a base station associated with the second cell, to an ultra-reliable low latency communication (URLLC) user equipment (UE) located in the second cell; and
  means for reducing transmission power of the apparatus, in at least one resource, to reduce interference with the transmission by the base station to the URLLC UE,
    wherein the transmission power is reduced for at least a portion of an entire remainder of a slot, subframe, or frame in which the communication information is received.

44. The apparatus of claim 43, wherein the communication information includes a negative acknowledgment message that is related to the transmission and that is transmitted by the URLLC UE.

45. The apparatus of claim 43, wherein the communication information is received in at least one particular resource,
  wherein the at least one particular resource is designated for acknowledgment or negative acknowledgment messages for URLLC traffic.

46. The apparatus of claim 45, wherein the apparatus is configured to monitor the at least one particular resource based at least in part on the second cell being associated with the URLLC UE.

47. The apparatus of claim 43, wherein the transmission power is reduced for the entire remainder of the slot, subframe, or frame in which the communication information is received.

48. The apparatus of claim 43, wherein the transmission power is reduced for less than the entire remainder of the slot, subframe, or frame in which the communication information is received.

49. The apparatus of claim 43, wherein the transmission power is reduced to zero.

50. The apparatus of claim 43, wherein the at least one resource includes multiple sets of resources,
  wherein the transmission power is reduced in each set of resources of the multiple sets of resources.

51. The apparatus of claim 50, wherein at least one particular resource, of the multiple sets of resources, is associated with at least one of:
  a first transmission of the transmission, or
  a retransmission of the transmission.

52. The apparatus of claim 50, wherein at least one particular resource, of the multiple sets of resources, is determined based at least in part on a traffic profile for URLLC traffic associated with the URLLC UE.

53. The apparatus of claim 43, wherein the at least one resource includes at least one of:
  a resource block,
  a sub-band, or
  a mini-slot.

54. The apparatus of claim 43, wherein the communication information is associated with enabling or disabling a monitoring process on the apparatus.

55. The apparatus of claim 43, wherein the communication information is received from the base station associated with the second cell based at least in part on the URLLC UE being located in the second cell.

56. The apparatus of claim 43, wherein the communication information is received on a backhaul network.

* * * * *